United States Patent [19]

Syre et al.

[11] Patent Number: 4,931,931
[45] Date of Patent: Jun. 5, 1990

[54] METHOD AND A SYSTEM FOR PROCESSING LOGIC PROGRAMS

[75] Inventors: Jean-Claude Syre; Harald Westphal, both of Munich, Fed. Rep. of Germany; Max Hailperin, Hayward, Calif.

[73] Assignee: European Computer-Industry Research Centre GmbH, Munich, Fed. Rep. of Germany

[21] Appl. No.: 70,818

[22] Filed: Jul. 2, 1987

[30] Foreign Application Priority Data

Jul. 8, 1986 [EP] European Pat. Off. ........ 86109342.5

[51] Int. Cl.$^5$ .............................................. G06F 9/00
[52] U.S. Cl. .................................. 364/300; 364/200; 364/275; 364/259
[58] Field of Search ... 364/200 MS File, 900 MS File, 364/300

[56] References Cited

U.S. PATENT DOCUMENTS 4,775,934 10/1988 Houri et al. ......................... 364/300
4,811,210 3/1989 McAulay ............................. 364/200

OTHER PUBLICATIONS

J. H. Chang, A Despain & D. DeGroot-And-Parallelism of Logic Programs Based on a Static Data Dependency Analysis, In IEEE 1985, *Digest of Papers*, pp. 218-225.
Peter Borgwardt. "Parallel Prolog Using Stack Segments on Shared Memory Multiprocessors". In IEEE (editor), 84 *Int. Symposium On Logic Programming*, pp. 2-11, Feb. 1984.
J. H. Chang & Doug DeGrott. "AND-Parallelism of Logic Programs Based on Static Data Dependency Analysis". In *Draft Proc. Afcet*85, p. 11. Oct. 1984.
A. Ciepielewski, B. Hausman and S. Haridi. "Initial Evaluation of A Virtual Machine for OR-Parallel Execution of Logic Programs". In J. V. Woods (editor), *Fifth Generation Computer Architectures*, pp. 81-99. Royal Institute of Technology, Sweden, 1986.
J. Crammond. "A Comparative Study of Unification Algorithms for OR-Parallel Execution of Logic Languages". In D. DeGroot (editor), *Int. Conf. on Parallel Processing*, pp. 131-138. IEEE, St. Charles, Ill., Aug. 1985.
Seif Haridi & Andrzej Ciepielewski. "An Or-Parallel Token Machine". In Nucleo de Inteligencia Artificial, Universidade Nova de Lisboa (editor), *Proc. 1983 Logic Programming Workshop*, pp. 537-552. Stockholm Sweden, Jun. 1983.
K. Kumon, H. Masuzawa, A. Itashiki. "Kabu-Wake: A New Parallel Inference Method and is Evaluation". In *Proc. IEEE Compcon 86*, pp. 168-172. San Francisco, Mar. 1986.
Yukio Sohma, Ken Satoh, Koichi Kumon, Hideo Masuzawa, Akihiro Itashiki. "A New Parallel Inference Mechanism Based on Sequential Processing". In UMIST (editor), *IFIP TC-10 Working Conf. on Fifth Generation Computer Architecture*. Manchester, Jul. 15-18, 1985.

*Primary Examiner*—Gareth G. Shaw
*Assistant Examiner*—Debra A. Chum
*Attorney, Agent, or Firm*—Bell, Seltzer, Park & Gibson

[57] ABSTRACT

In a method for processing logic programs—especially in Prolog-like languages—using at least one processor, which allows parallelism—also retroactively—by an existing process, called "father", creating at optional OR-parallel nodes at least one process, called "son", standing in an OR-parallel relationship to the father, a deep-binding list, called "hash-window" is created only for the newly created son in which—while processing the split-off OR-parallel branch—it performs bindings to variables commonly accessible to it and its father, called "commonly accessible variables."

8 Claims, 8 Drawing Sheets fig. 1.

RESULTS LISTS:
CURRENT LEFT: a          RIGHT: 1

Fig. 9.

RESULTS LISTS:
CURRENT LEFT: a          RIGHT: 1, 2

METHOD AND A SYSTEM FOR PROCESSING LOGIC PROGRAMS

BACKGROUND OF THE INVENTION

1. Field of the invention

The invention concerns a method and a system for processing logic programs in parallel - especially in Prolog-like languages - using at least one processor, which allows parallelism - also retroactively - by an existing process, called "father", creating at least one process, called "son", standing in a parallel relationship to the father.

2. Description of the prior art

The state of the art in parallel processing logic programs—especially in Prolog-like languages—is the retroactive conversion of a sequential computation into an OR-parallel one by copying the common bindings to the new process after undoing all bindings made by the old process after the split OR-node. In this way conflicting bindings by alternative OR-parallel branches to common variables can be performed, since each process has a private copy of the memory space needed for representing the variable bindings. Disadvantages of this method are the time and space needed for copying and the time needed for undoing the bindings. Often the split-off OR-parallel process fails after a few steps and thus most of the work during its creation is wasted.

Further terms and expressions are defined later at the beginning of the detailed description of a preferred embodiment of the invention.

SUMMARY OF THE INVENTION

It is a primary object of the present invention to provide a method and a system for processing logic programs concurrently or in parallel in which a flexible conversion of a sequential computation to a parallel one and a deliberate combination of these processing modes with low overhead is possible.

This task is solved by creating a method for processing logic programs in which a deep-binding list, called "hash-window", is created only for the newly created OR-parallel process. In this hash-window it performs bindings to variables commonly accessible to itself and to those processes it stands in OR-parallel relation to, e.g. its father. This has the advantage of a very low overhead for process spawning. Process creation requires no copying of common variables and no undoing of irrelevant bindings. The savings of this method are dependent on the work that has already been done by the old process, i.e. it is greater the later the split occurs. In this method the cost for an OR-parallel split is low and not dependent on the history.

In a preferred meethod according to the invention, the potential OR-parallel nodes in the father are identified with labels, called "OR-branch-levels". This has the advantage of providing a reference frame for specifying the extent of variable bindings, i.e. for specifying what portions of the computation each variable binding is valid for.

In a further preferred method according to the invention, the newly created process, the son, has access to a level, called "split-off label", indicating the OR-branch-level of the potential OR-parallel node in the father from which it was split off. This has the advantage of allowing the newly created process to know what portion of the father's computation it is, in terms of the above mentioned reference frame.

In a further preferred method according to the invention, the old process, called "father", performs bindings to variables commonly accessible to it and OR-parallel processes, using shallow binding, and tags them with a label, called "binding label", indicating the OR-branch-level of the youngest existing potential OR-parallel node in the father. The advantage of shallow binding is a fast access to variables as no deep-binding lists have to be searched. The binding label enables the extent of each binding to be identified.

In a further preferred method in accordance with the invention, the OR-branch levels of the potential OR-parallel nodes existing at any time in any one process form a sequence ordered by the time at which the nodes were created. This has the advantage of making it easy to test whether one portion of a process's computation is contained within another.

In a further preferred method in accordance with the invention, the split-off process compares said split-off label with said binding label to find out whether the binding was performed by a goal of the old process before or after the split, and thus whether the labeled binding is valid not only for the old process but also the split-off process. The advantage of this method is the possibility to retroactively create OR-parallel processes at all potential OR-parallel nodes while imposing only little overhead on the father process. In the father process a potential OR-parallel node is created by just increasing the current OR-branch level, i.e. the overhead is negligible. However, this gives the possibility to retroactively add OR-parallel processes at all these points and thus guarantees an adaptable loading of a parallel processor system. The father process not only has a low direct overhead, but also has no indirect overhead, in that it is not forced to use deep binding.

The overall task is also solved by a method to process logic programs in parallel, which combines the results of an AND-parallel execution of independent subgoals of a compound goal incrementally. This has the advantage of forming pairs of solutions to the compound goal as early as possible.

In a further preferred method in accordance with the invention, said combined solutions are formed and represented as structures, called "join-cells", containing pointers to said subgoals' solutions. This has the advantage of forming the pairs at very low cost —in terms of time as well as in terms of memory—as no copying is needed. This is especially advantageous in the case of a distributed memory because the pairing is done without any accesses to other processors' memories.

An especially favoured method in accordance with the invention obtionally combines all modes of execution: sequential, OR-parallel, and/or AND-parallel. This enables a system executing the method according to the invention to adapt the amount of parallel processes to the available resources. If the system is not saturated, AND- as well as OR-parallelism can be exploited to create more parallel processes. If on the other hand the system is saturated, very efficient sequential execution is possible—with almost no additional overhead compared with known state-of-the-art sequential Prolog implementations.

In a further preferred method in accordance with the invention, it is possible to backtrack into a parallel AND by first backtracking into one AND-parallel branch, called the right-hand side, and then, after all solutions to the right-hand side are found, by backtracking into the other branch, called the left-hand side. This has the advantage of being consistent with state-of-the-art sequential Prolog implementations.

In a further preferred method in accordance with the invention, the backtracked solutions to the right-hand side are converted from shallow to deep binding and saved so that they may be paired with solutions to the left-hand side computed later. This has the advantage of assuring maximum asynchrony of the computation, resulting in all solutions being computed as early as possible.

In a further preferred method in accordance with the invention, the backtracked solutions to the right-hand side are recomputed when paired with solutions to the left-hand side computed later, after all solutions to the right-hand side are backtracked. This has the advantage of a very simple and space-efficient implementation, highly consistent with that of state-of-the-art sequential Prolog implementations. It also has the advantage of not requiring the searching of deep-binding lists.

In a further preferred method in accordance with the invention, the backtracked solutions are recomputed by dynamic programming, i.e. by saving and restoring them. This has the advantage of avoiding redundant recomputation, while still preserving the simplicity of the basic recomputation scheme, and also preserving the avoidance of deep-binding. It also provides a form of the right-hand solutions which remains from recomputation to recomputation, easing the incremental formation of the cross product.

In a further preferred method in accordance with the invention, a solution to the left-hand side, that necessitates the recomputation of one or more solutions to the right-hand side is not paired with any solution to the right-hand side until all solutions to the right-hand side are backtracked the next time. This simplifies the incremental formation of the cross product by avoiding keeping track of which right-hand solutions need to be paired with the left-hand solution, when they are recomputed, and which don't need to be recomputed, since they already have been. This is particularly important if dynamic programming is not used for the recomputation.

In a further preferred method in accordance with the invention processes are only created on unsaturated processors. This has the advantage of not overloading the parallel processor system. The overhead of parallel processing—process management, creation of deep-binding lists, and searching deep-binding lists—is only necessary, if there is a real parallel execution. Because of the ability to retroactively parallelise both, OR- and AND-nodes, no opportunities for parallelism are missed by this specialisation. The cheap retroactive parallelisation and the parallelisation only on unsaturated processors ensure that just as much parallelism is created as the processors can optimally realise.

Still further objects and advantages of the invention will be apparent from the following detailed description of a preferred embodyment of the invention with reference to the accompanying drawings, wherein:

DETAILED DESCRIPTION OF PREFERRED EMBODYMENT

For the better understanding of the invention, there is a short introduction to the language and the important types of predicates which may be used for the method for processing logic programs according to the invention.

The user language for the computational method or system is a modified Prolog. Prolog programs are divided into two types of modules: the sequential and the parallel ones. The sequential modules contain the user interface and other I/O, they are written in conventional Prolog. They can invoke the parallel modules by calling one of their predicates via a "bagof", "setof", or "oneof" predicate. The language of the parallel module has no "cuts", no "asserts" and "retracts", and no I/O.

OR-parallelism

Each predicate definition in the parallel module—if processed according to the method of the invention—is preceded by a property declaration. There are three kinds of properties:

Solutions:
Either all or only one solution of the predicate is calculated. This construct replaces the "cut" of normal Prolog.

Clauses:
The clauses of this predicate must either be processed in the textual order of the program (ordered) or there are no restrictions on the order (unordered).

Execution:
This property is a recommendation for the way in which a predicate is executed. In "eager" execution mode all clauses of the predicate are intended to be executed concurrently, that is parallel. In "lazy" execution mode the solutions have to be produced one at a time by backtracking.

AND-parallelism

AND-parallelism is explicitly controlled by the programmer. A comma between two goals enforces sequential execution, a hash (#) allows AND-parallel execution.

Frame Organization

Below the frame organisation used in the method for processing logic programs is described.

One kind of a frame is an activation record. For each invocation of a goal an activation record is created. Its main constituent are slots for all local variables of the invoked goal. These slots contain the bindings of the variables or a mark that the variables are unbound. Other frames as for example hash-windows and join-cells will be introduced later.

OR-parallelism

Below OR-parallel execution is explained.

One Processor

To begin with, there will be a description of the method if only one processor is available.

Each processor executes a process called "main branch". The activation record created at the invocation of the first goal is allocated in the runtime stack. At the invocation of the next goal another activation record is pushed onto the runtime stack. The bindings of the variables that resulted from unification are recorded in the slots of the activation record. Recording bindings in the slots of their creators' activation records is called shallow binding. The addresses of all variables that were bound are also recorded in a trail-stack.

If a called predicate has multiple unifiable clauses, and if the execution mode of the predicate is "lazy", a choice point is pushed onto the runtime stack listing all these clauses, except the first one, which is immediately executed by the main branch. If the predicate is "eager" rather than "lazy", a branch point is used instead of a choice point. This has the same structure but enables parallel execution of the clauses listed in it. Each time a branch point is pushed onto the runtime stack, the current OR-branch-level of the process is incremented. At its creation, the OR-branch-level was initialized to certain value, e.g. to 0. Each binding is tagged with the OR-branch-level that was current when the binding was performed.

If no unifiable clause can be found for a goal, all activation records up to the last choice point or branch point with still untried alternatives are removed from the runtime stack, and all the bindings that were performed by the goals whose activation records were removed, are reset to "unbound" using the trail-stack. This operation is called backtracking. The next untried alternative is called, its activation record is allocated in the just freed stack space.

Except for tagging the variables with the OR-branch-level of their binding goal, there is no additional overhead compared to conventional sequential Prolog processing.

Many Processors

By means of FIG. 1 the method will be explained for the case that there are many processors available for the processing of the program.

Figure 1:
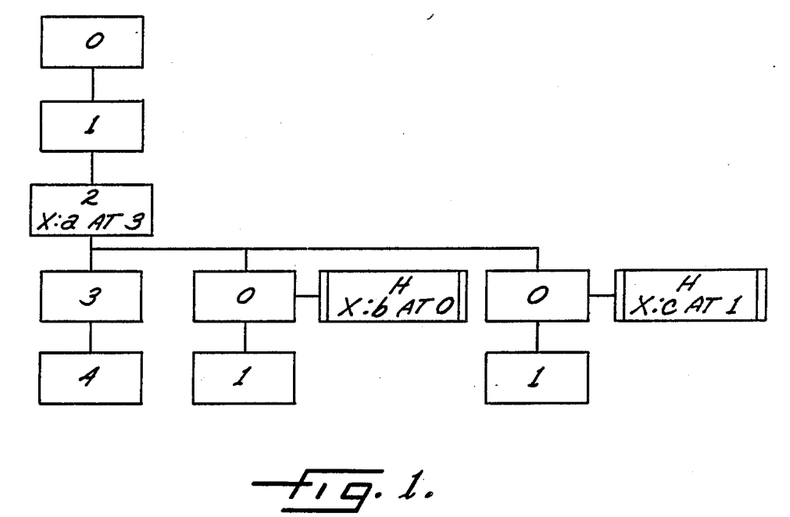
FIG. 1 shows an OR-parallel execution of a program.

FIG. 1 shows a main branch with two split-off processes, called "OR-parallel children". The goals of each process are aligned vertically. The numbers of the goals are their "OR-branch-levels". The hash-windows of the split-off processes are marked with an "H" and with double vertical bars. They are arranged at the right side of the process they belong to, and are connected to it by horizontal lines.

If a main branch comes to a predicate with multiple unifiable clauses that is declared as "eager" and there are enough idle processors available, each of them is given a clause, except the first one, which stays on the original processor. The new processors start new main branches, the OR-parallel children.

As the OR-parallel children start with alternative clauses of the predicate, they may bind variables of the original main branch to conflicting values. This is why they are not allowed to bind these variables in place, that means they are not allowed to perform shallow bindings. Rather, they have to bind these variables in private deep-binding lists. Each of the new processes has such a deep-binding list which is called "hash-window". The hash-window maps the address of a bound variable into its local value. Each of the new processes starts executing as described in the previous sections.

Access to variables created by the new branch is direct, as shallow binding is used. Access to variables outside the new branch is no more a direct one-step operation. Rather, the original location of the variable has to be checked to find out whether it has been bound by an ancestor in the main branch. In this case the binding is valid. If the variable is marked unbound in its place, the child's hash-window has to be accessed to check whether the variable got bound by the OR-parallel child, i.e. by a goal of the new main branch after the split before the current goal. If no entry is found in the hash-window, the variable is still unbound.

One clause of the OR-parallel predicate is executed by the original processor and uses shallow binding for the variables of the common ancestors. The OR-parallel sons on the other processors must ignore these bindings. This is achieved by comparing OR-branch-levels. A binding found in an ancestor outside the current branch is only valid if the accessing descendent split off after the binding goal.

Figure 2:
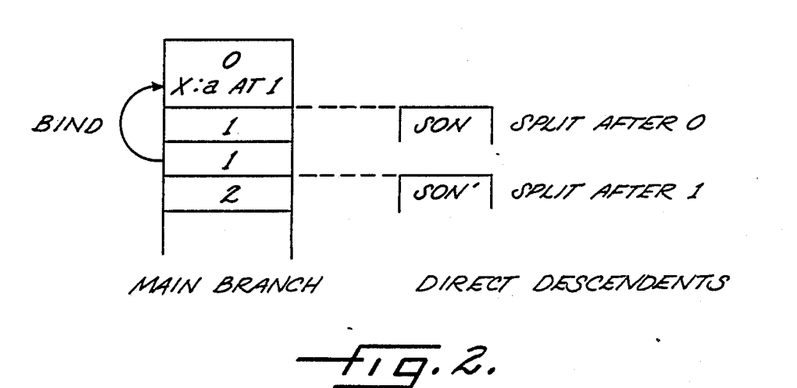
FIG. 2 the use of OR-branch-levels.

To identify the point where a son split off the main branch, the son has access to, e.g. in its hash-window, the OR-branch-level of the parent or father after which the son was split off, as shown in FIG. 2.

In the main branch of FIG. 2, four activation records are displayed with their OR-branch-levels, the second of level 1 was a call to a predicate with only one unifiable clause, or a lazy one. This goal bound the variable, X, of the first goal to "a". The binding is tagged with its OR-branch-level "1". One process, a son, split off after level 0, another after level 1. For the former, X is unbound as the process split off after level 0 before the binding tagged "at 1" was performed at level 1 of the main branch. For the son, split off after level 1, the variable is bound to "a" as this process was split off after the binding at level 1.

If the son accesses a bound variable in the parent's runtime stack, it compares the OR-branch-level of the binding goal, the tag of the binding, with the split-level in its hash-window. The binding is valid if and only if the binding level is not higher than the split level.

If a variable is bound in its own level—either by its creator or by later goals, but before the next OR-parallel node—the binding is always valid. In this case no hash-windows have to be checked.

Nested OR-parallelism

Figure 3:
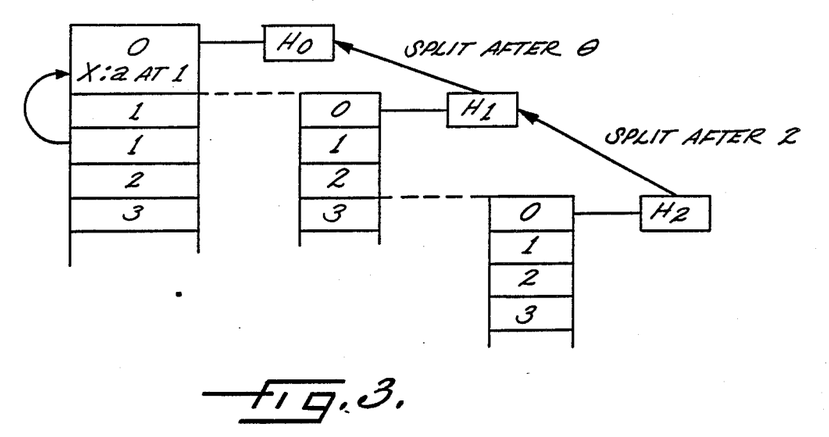
FIG. 3 the use of nested OR-branch-levels.

FIG. 2 shows an example in which two processes were split off from the same main branch. In the following paragraphs, by means of FIG. 3, nested OR-branch-levels will be described, which are created when a process is split off from another process which was already split off. FIG. 3 shows a first son split off from the main branch after level 0 and a second son split off from the first son after level 2 of the first son.

From FIG. 3, it is to be seen that if a split-off son again splits off children these also need private hash-windows. The main branch at the left-hand side of FIG. 3 has been split off from another process not shown in this figure; that is why this main branch has a hash-window of its own, marked $H_0$. All the hash-windows in FIG. 3 are chained pointing to the hash-windows of the father's processes. By this a tree of hash-windows is generated. When accessing a variable that was not created in the current main branch and not bound by an ancestor in the main branch it was created in, all hash-windows in the chain have to be searched until a binding is found or the hash-window is encountered, that was current while the variable was created.

If, in the case shown in FIG. 3, the second son accesses the variable X of the main branch which was bound by level 1, since it has the tag "at 1", the second son has to follow its hash-window chain beginning at the current hash-window, $H_2$, which is its private hash-window, until it finds the hash-window that was current when the binding of the variable X was done. In this case it is the hash-window $H_0$. In the hash-window $H_1$, which is searched immediately before by the second son, the relevant split level, here "after 0", is recorded. The level number "after 0" in the hash-window $H_1$ of the first son, shows that the first son split off from the main branch before the binding of the variable X was done by the goal at level 1 of the main branch, thus the variable is still unbound for the first and also the second son. In general the procedure works as below:

If a variable is shallowly bound, children of split-off sons have to distinguish their uncle's bindings from their grandfather's. They cannot use their current hash-windows to find the relevant split-level as these windows only contain the level of the father of the last split, as it is shown in FIG. 3. They have to follow their hash-window chain until they find the hash-window that was current when the binding was made, i.e. the hash-window belonging to the sequential branch in which the binding is recorded. The hash-window searched immediately before this in the chain was created when the ancestor of the current branch split off from the branch in which the binding was performed. It contains the relevant split-level.

If the binding is found in a hash-window rather than in an activation record, this is of course the hash-window that was current when the binding was made.

Only OR-branch-levels of the same sequential branch are ever compared. The OR-branch-levels in the hash-windows of the sons are OR-branch-levels of their parents. Thus these numbers only need to be unique within one branch, each son of a branch can reinitialize its ORbranch-level.

When the number of bits allocated to the OR-branch-levels overflows, e.g. every 256 potential OR-parallel nodes for 8-bit tags, all branches must receive hash-windows. This means, also the main branch gets a new hash-window, initialises its current level and is not allowed to perform shallow bindings to variables older than this hash-window.

Retroactive OR-parallelism

With the method for processing logic programs described so far, a sequential computation is easily converted into a parallel one also retroactively at a very low cost. For a main branch there is no difference whether it has OR-parallel children or not. Thus when creating a new OR-parallel process on another processor, nothing in the branch that splits off another process has to be changed.

AND-parallelism

Now the AND-parallel processing according to the method for processing programs will be described. AND-parallelism is only performed on independent goals. Two or more goals are independent, if none of them reads variables that the other writes, where each writing-operation includes a read-operation. Thus there are no synchronization problems.

Basic AND-parallelism

To explain the main principle of AND-parallelism according to the invention, the description begins with the basic AND-parallelism of two goals whose execution does not cause the creation of any branch-points.

Since—in contrast with OR-parallelism—there are no conflicting bindings, AND-parallel goals may just be started in parallel without separate hash-windows. The left-hand goal stays on the same processor while the right-hand one is offered to other idle processors using the same mechanism as with OR-parallel branches.

If the right-hand side has not been given away on the completion of the left-hand goal, the same processor will also take the right-hand one. In this one-processor case, the method works as with normal sequential Prolog.

Real AND-parallelism is achieved if a processor for the right-hand goal is or becomes available while the left-hand goal is computed. Although a hash-window for the remote process is not necessary one could be used for caching. At the end the AND-parallel branches are joined. The first in time has to wait for the other to complete.

AND-parallelism with one OR-parallel branch

If only one of the AND-parallel branches contains branch-points, the normal mechanism for OR-parallelism is used; all split-off sons get hash-windows. Whenever one of these branches reaches the end of the AND, it has to wait for the other side to deliver its solution. When the solution exists the parallel branches just proceed.

The non OR-parallel branch is shared by each of the OR-parallel branches. As the non OR-parallel branch does not contain any branch points the OR-branch-level is never increased; all bindings are tagged with the level that was current at the split. Thus these bindings will be visible for all children of the OR-parallel branch.

AND-parallelism with OR-parallelism

Join-cells

If both sides of an AND-parallel split contain branch-points there can be multiple solutions at the same time for both branches. In this case the cross product of the left-hand and right-hand solution sets has to be formed.

A member of a cross product is a process that has one process of the left-hand side and one of the right-hand side as ancestors. Access to the bindings of these ancestors is realised by an extension of the hash-window scheme, i.e. by the join-cells shown in FIG. 4.

Figure 4:
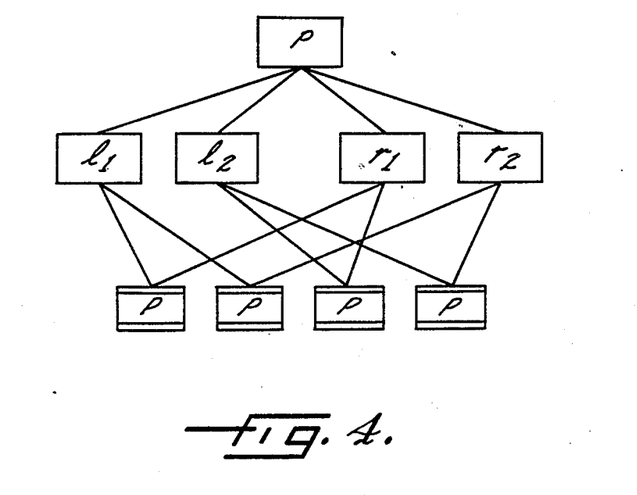
FIG. 4 the forming of a cross product by join-cells.

In FIG. 4, plain boxes represent hash-windows. They are labelled with the names of the goals whose execution caused their creation. In the example of FIG. 4, after the goal p, the AND-parallel goals l and r were called; l in turn called the OR-parallel goals $l_1$ and $l_2$, r in turn called the OR-parallel goals $r_1$ and $r_2$. Only goals that caused the creation of hash-windows are shown in the figure. The boxes marked with double horizontal bars are join-cells.

Processes can be identified by hash-windows, each process having exactly one current hash-window. Thus, to be able to pair two processes, a join-cell contains three pointers: one to the hash-window of the left-hand solution, the l-pointer, and one to the hash-window of the right-hand solution, the r-pointer: finally the join-cell contains a third pointer, the last-common-hash-window pointer, to the hash-window that was current at the time of the AND-parallel split.

Looking up a variable from a goal after the AND-parallel join works as follows: An "end-of-search variable" is initialized to the address of the hash-window associated with the defining goal of the non-local variable being looked up. The linear chain of hash-windows is followed in the usual way until a join-cell is reached. Now a branch is necessary. The l-pointer of the join-cell and the current value of the end-of-search variable are pushed onto a stack. The value of the end-of-search variable is set to the last-common-hash-window of the join-cell, and the r-pointer of the join-cell is followed. If searching this right-hand side branch is not successful, that is, if the end-of-search value is reached before a binding of the variable is found, the search is resumed by popping the last l-pointer and end-of-search value off the stack. If the stack becomes empty, this means, that the variable is still unbound.

Figure 5:
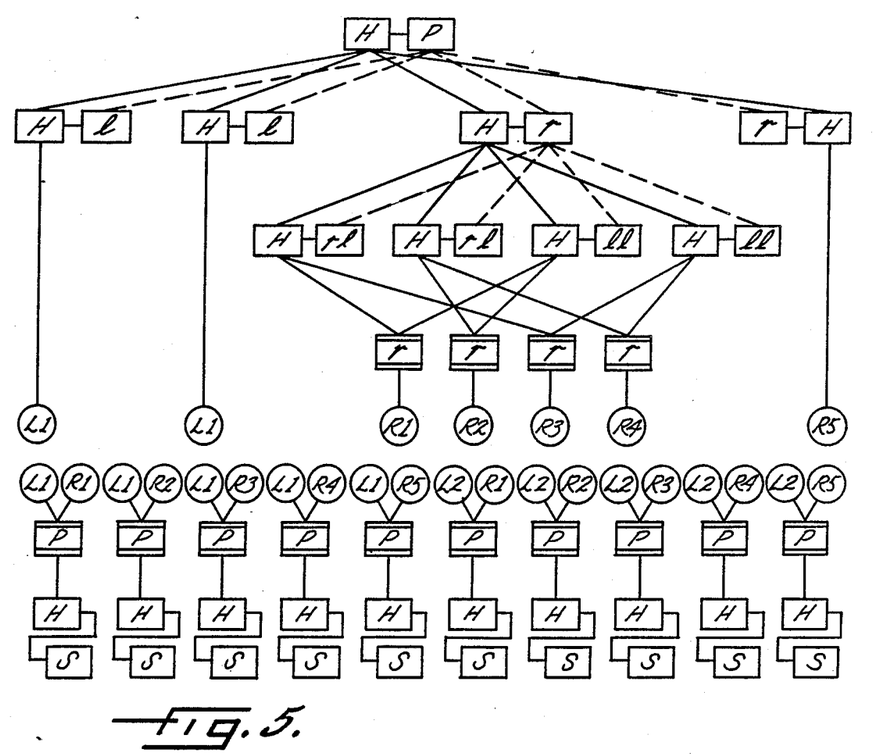
FIG. 5 a nested AND/OR-parallelism; (schematically)

FIG. 5 shows a frame layout of nested AND-OR-parallelism after the execution of the following program:

$$p :- \# \, l \, r, s \quad rl :- .. \quad l :- .. $$
$$rl :- .. \quad l :- .. $$
$$r :- rl \# rr \quad rr :- .. \quad s :- .. $$
$$r :- .. \quad rr :- .. \quad s :- .. $$

In the clause p the goals l and r are AND-parallel. l and r are OR-parallel predicates with two solutions each. For illustrative reasons, each of them is drawn with a hash-window. In one of the r-branches the AND/OR-parallelism nests, i.e. r calls rl and rr, which are AND-parallel goals, both of which are OR-parallel predicates. Again, all OR-parallel branches are drawn with a hash-window for illustrative reasons. The final goal, s, is OR-parallel. Only one of its branches (one with a hash-window) for each call is shown in the diagram of FIG. 5. The hash-window associated with p represents the one it would use for global bindings, i.e. that of the last OR-parallel split before p. The hash-windows are marked with an "H". The join-cells are marked with double horizontal bars and their last-common-hash-window.

OR-branch-levels

The two branches of an independent AND-parallel execution belong to the same computation and thus need not be distinguished, i.e. they can use the same OR-branch-level in both branches. If both branches were to become OR-parallel, without taking special precautions, there would be two processes, the two main branches, which would be allowed to write into the common part before the AND-parallel split. As they would use the same OR-branch-level their bind-ings in the common part would not be distinguishable. To make their bindings distinguishable, all clauses of the first OR-parallel split in the right-hand branch must be executed using deep-binding, whether they are executed by son processes or by the father process.

Join-cells are only necessary for those members of the cross-product for which the solutions to both AND-branches contain hash-windows. There may be one left-hand solution without a hash-window. In this case join-cells are not necessary for those members of the cross-product containing that left-hand solution.

Figure 6:
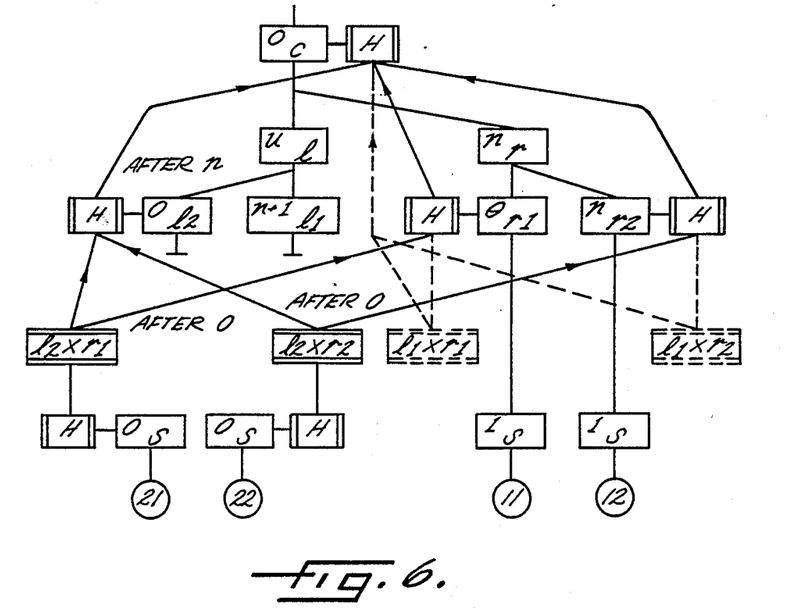
FIG. 6 OR-parallelism nested into AND-parallelism.

FIG. 6 demonstrates the execution of an AND-parallel split with both branches being OR-parallel. It shows the frame layout after the execution of the following program. The activation-records of the primed goals l', r', ll', rr' are not displayed:

$$?-C, ..., l'//r', s. \quad l':- l, ll'. \quad ll':- l_1. \quad ll':- l_2.$$
$$r':- r, rr'. \quad rr':- r_1. \quad rr':- r_2.$$

After goal c, the AND-parallel goals l' and r' were called. l' consists of a part, l, common to all solutions, and the OR-parallel individual parts $l_1$ and $l_2$. r' is similar. Thick lines represent activation records with the names of the goals on the right and the level number of the goals on the left, and the control flow. The goals of each process are vertically aligned. Circles label the outcoming four processes, 11, 12, 21 and 22. The "ground"-symbol denotes process termination. Thin lines are hash-windows marked with an "H" and with double vertical bars; join-cells are marked with double horizontal lines and with the pair of solutions that they represent. The "last-common-hash-window" of all join-cells is the one attached to c. Horizontal lines connect the processes with their hash-windows. The tag "after n" at a pointer means "split off after generation n".

Variable accesses from s and its successors into the AND-parallel goals and their predecessors works as described above, providing there is a join-cell (processes 21 and 22): "If while following the hash-window chain a join-cell is encountered, the right-hand branch is investigated first until the last common-hash-window is reached. Then the left branch is followed continuing up beyond the split." Note that the non-local bindings done by r are in the activation records before l up to c including c's hash-window. They are indistinguishable from l's bindings and will be read together with these. The bindings in r itself are of level n and thus always valid. The tag "after 0" at the right-branch pointers of the leftmost join-cell is necessary for process 21 to ignore the bindings made in $r_1$ and its associated hash-window by the goal s of process 11 at level 1. The same holds for process 22 to ignore the bindings made by process 12 in $r_2$.

The dashed join-cells in FIG. 6 are only conceptually necessary and showed here to ease understanding. In reality they do not exist. In these cases, where there is no join-cell (processes 11 and 12) the bindings of $l_1$, they are tagged with level n+$l_2$, would be invisible if the hash-windows of the first right-hand-side split contained the normal "split off after level n" tag. Instead, they are specially marked as the first OR-parallel split of a parallel AND's right-hand side, in FIG. 6 with a "*". If a hash-window with such a pointer is encountered, there are two cases:

1. The parent hash-window it points to is equal to the end-of-search pointer, which is the last-common-hash-window on top of the stack that is used when a join-cell is found. In this case, there was a join-cell, thus we are not in a member of the cross-product containing $l_1$ (processes 21 and 22), and so the left-hand side branch must be searched as usual.

2. Said two pointers are different. This means, that there was no join-cell. This is at the beginning of the right-hand-side branch that got paired with the $l_1$ left-hand-side branch. In this case the hash-window is treated as "split off after level infinity". Thus all bindings in the left-hand branch beginning with c down to the end of $l_1$ are valid. Searching the left-hand-side is not necessary.

Left- and Right-hand Side Start on the Same Processor

Just as it is possible for a branch point to be executed as if it were a choice point, it is possible for a parallel-AND to be executed as if it were a sequential one. When the original process reaches the AND-join with a left-hand solution, it is possible that the right-hand side has not been given away yet. If so, the original process can continue with the right-hand side of the AND. No additional hash-window needs be created. However, the OR-branch-level has to be incremented. This allows the bindings made by the left-hand side to be distinguished from those made by the right-hand side. In this case the process need not use deep-binding for those clauses of the first potential OR-parallel node of the right-hand side that it executes itself. AND-goals are executed with the minimal number of hash-windows., only real OR-parallelism needs hash-windows. If the AND-goal is executed by only a single processor, no hash-window at all will be created. This will be described in further detail in the following paragraphs.

Figure 7:
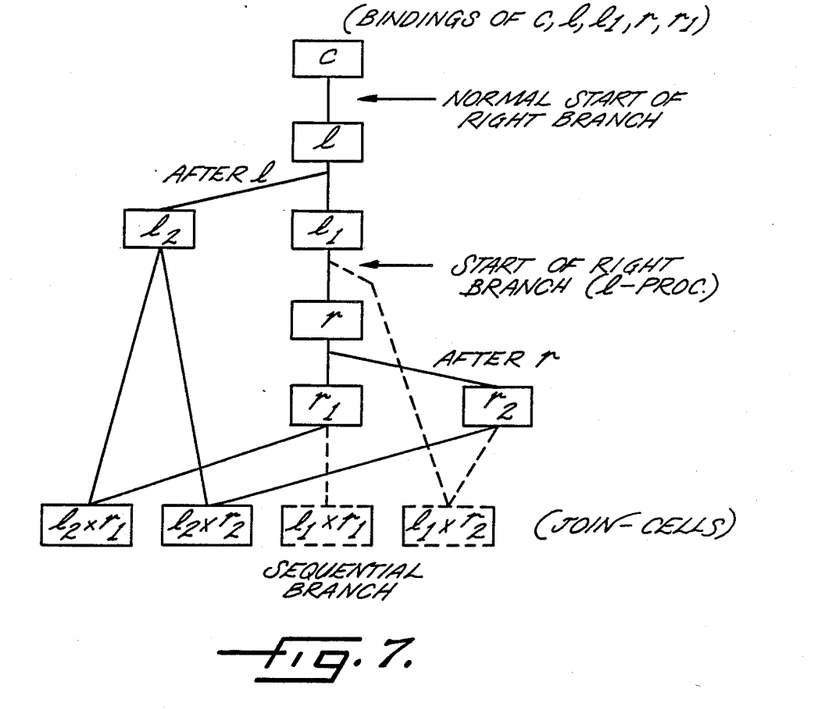
FIG. 7 retroactive parallelism in AND-parallel goals.

FIG. 7 shows a schematic frame layout for retroactive parallelism in AND-parallel goals for the following program. Again hash-windows or activation-records of primed goals are not displayed:

$$?-c, l' \,\text{\#}\, r'. \qquad l':- l, l''. \qquad l'':- l_1. \qquad l'' :- l_2.$$
$$r':- r, rr'. \qquad rr':- r_1. \qquad rr':- r_2.$$

After goal c, the AND-parallel goals l' und r' were called. l' consists of a part, l, common to all solutions and the individual parts $l_1$ and $l_2$; r' is similar. FIG. 7 demonstrates the situation of an AND-parallel goal initially being executed sequentially. As no processors were available, the first solutions $l_1$ and $r_1$ were executed sequentially. Before the AND-goal there was a goal c which was a common predecessor of both AND-sides. The same processor started the left-hand-side, l, which later created a potential branch-point and delivered the first solution $l_1$. The right-hand side had not yet been given away, so the same processor also took this task, first computing something in common to all right-hand solutions, r, and later, the first solution $r_1$. Shallow binding was applied all the time: thus the bindings of c, l, $l_1$, r and $r_1$ are only distinguishable by their level number and some of them can found in c's activation record or hash-window.

Later, processors became available and OR-parallel children $l_2$ and $r_2$ were split off to other processors.

At the join of the AND, $l_1$ and $l_2$ get paired with $r_1$. Special care has to be taken in variable lookup after the cross product. When the successors of the member of the cross product containing $l_2$ and $r_1$ look up variable bindings, they must ignore those bindings made by $l_1$. Investigating the $l_2$-branch of the join-cell bears no danger, as $l_2$ split off the main branch before $l_1$ and thus $l_1$'s and its children's bindings are ignored. But on the $r_1$ branch $l_1$'s bindings would be visible were it not for the additional use of level number described below.

The last-common hash-window pointer is augmented by the OR-branch-level at which the right-hand side starts. Before bouncing back to the left-hand side, those variable bindings in the deep-binding level associated with the last-common-hash-window that are at this level or later (e.g. r's bindings) are examined. Those at earlier level (e.g. $l_1$'s bindings) are not examined.

Masking out $l_1$ is only necessary for those members of the cross product that do not contain it. Pairs containing $l_1$ never need a join-cell at all, as at most one AND-parallel branch, the right-hand one, has a hash-window. The search goes via $r_1$ or $r_2$ to r, $l_1$, l, and c without the necessity to distinguish these. As already mentioned, $r_1$ does not even need a hash-window if executed after $l_1$ on the same processor. The cross-product member containing $l_1$ and $r_1$ can continue executing in the same process, at one level higher.

Control

In the following paragraphs there will be a description of the control for the method for processing logic programs according to the invention.

OR-parallelism

Figure 8:
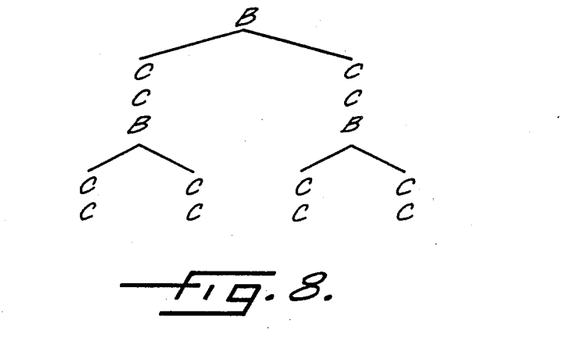
FIG. 8 a search tree combining OR-parallelism and backtracking.

Whenever an eager predicate with multiple clauses is called, a branch-point is created. The call of a lazy predicate with multiple clauses results in creating a choice point. The result is a tree of sequential processes with branches beginning at the branch points. FIG. 8 shows an example of such a tree in which C stands for a choice point and B stands for branch point. The leftmost branch of a branch-point stays on the same processor.

Retroactive OR-parallel Process Creation

A very important feature of the method according to the invention, is the ability to convert a sequential computation to a parallel one retroactively at a very low cost, as mentioned above. Whenever a processor becomes unsaturated it requests a task. Unsaturated processors are idle processors that are in a waiting state, e.g. because of net work latency. All processors have a list of their branch points with not yet processed alternative clauses. One of these is chosen and given to the idle processor. Nothing in the branch that split off the new process has to be changed. With this mechanism it is possible to generate just as many processes as the system offers resources. Thus the overhead for parallelism, e.g. process creation and deep binding, is only necessary if parallel processes are actually started.

To create a process only the goal with a pointer to the current hash-window and an indication of the father's level has to be transmitted. Further overhead, interprocess communication to get common variables, is only necessary on demand when the variables are really used. Thus, if the spawned process terminates soon, e.g. on failure, not much work is wasted in creating a private environment and in copying variable bindings to it. On the other hand, if the process gets older, more and more of the common variables are read and can be cached in the local hash-window, thus the process gains more and more independence.

Backtracking

If a process fails, it backtracks to the last choice point or branch point in that process. If this is a choice point, it executes the next alternative. If it is a branch point, it executes the next alternative that has not been given away yet. If there is no alternative that has not yet been given away the process has to wait for all sons of that branch point to terminate before it can backtrack over the branch point. If there are no choice points or branch points in the process, the process terminates.

In order to ensure that the entire search tree is explored, all branches eventually must fail and backtrack. This is accomplished by making successful branches report their solution and then fail.

AND-parallelism

AND-parallel process creation is performed using the same mechanism as for OR-parallelism. The potential AND-parallel splits are entered into the same list as the potential OR-parallel branch-points with not yet processed alternatives. Thus AND-parallel processes are created only on demand of an idle processor and possibly retroactively.

The cross product of the right-hand and left-hand solutions is formed incrementally as the solutions arrive; whenever a left-hand solution arrives, it is immediately paired with all existing right-hand solutions and vice versa, creating a join-cell if necessary. A join-cell is only necessary, if both AND-branches contain hash-windows. For each of these pairs, a process is started if processors are, or become, available. If there is no idle processor, the original processor executes sequentially one pair after another.

OR-parallelism, AND-parallelism, and Sequential Execution Combined

Whenever a solution to the right side of an AND arrives at the join, that is the point where the cross product is computed, an extensible branch point is created. Its descendants are the joins of that right-hand solution with each left-hand solution found so far (from the left-hand results list).

In FIGS. 9 to 17 the backtracking into an nested AND/OR-parallelism is explained. In these Figures "A" stands for an AND-parallel split. The solutions to the left-hand side are tagged by small letters, e.g. a:. The solutions to the right-hand side are tagged by digits, e.g. 1:. B* stands for an extensible branch point, which arity is not fixed. Backtracked choice points are tagged by C'. Letters in paranthesis, e.g. (a), on the right-hand side indicate the left-hand solution, which was taken for this member of the cross product.

Figure 9:
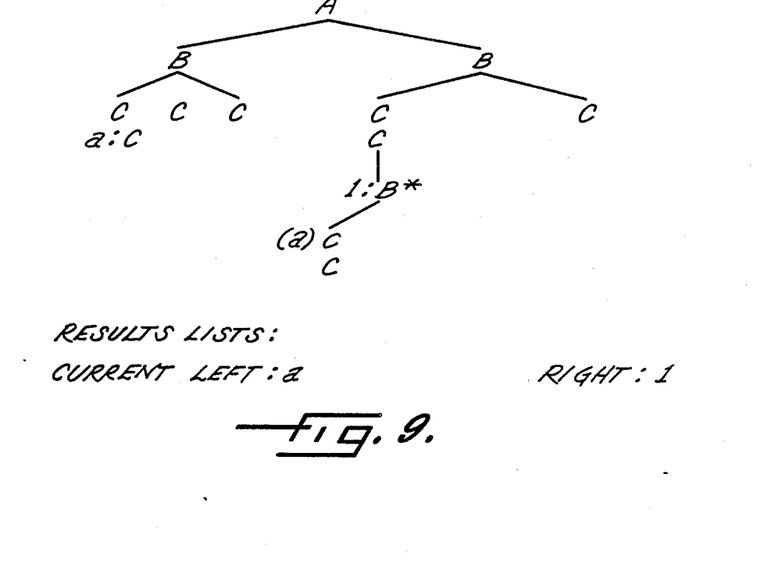
FIG. 9 an AND-parallel execution; first solution on each side.
Figure 10:
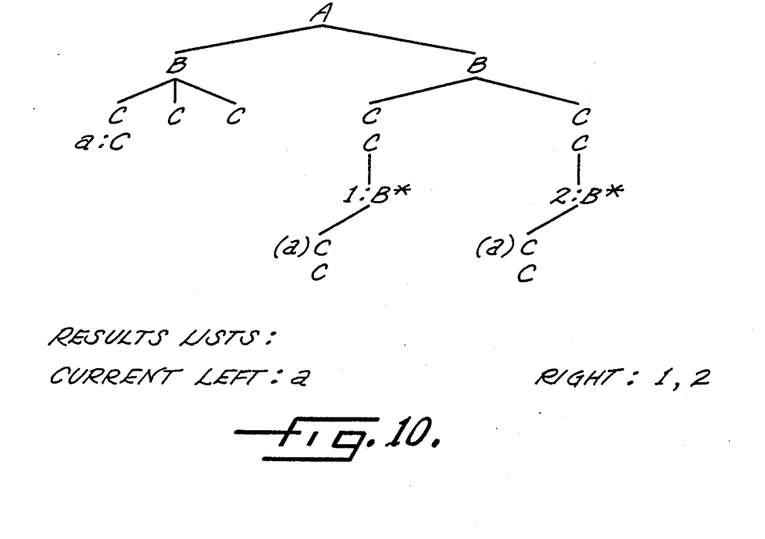
FIG. 10 an AND-parallel execution; another solution on the right.
Figure 11:
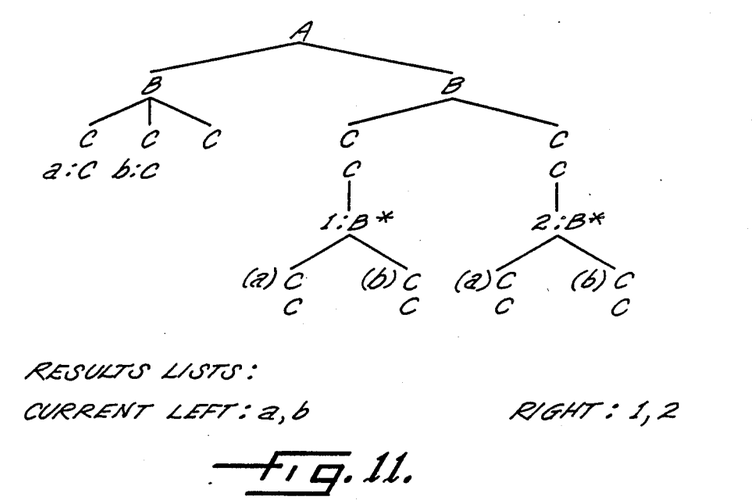
FIG. 11 an AND-parallel execution: another solution on the left.

FIG. 9 shows an AND-parallel execution, shortly after the first branch of each side has reached the join. FIG. 10 shows how the arrival of an additional right-hand solution leads to the creation of an additional extensible branch point. Whenever a solution to the left side of the AND arrives at the join, all the right-hand solutions' extensible branch points created so far are extended with one additional descendant. The right-hand solutions' branch points are found in the right-hand results list. FIG. 11 shows how the arrival of an additional left-hand solution leads to the extension of the extensible branch points.

If all branches beginning at an extensible branch-point failed, backtracking into the parallel AND is necessary. Because further solutions to the left-hand side may still be computed, provision must be made for pairing the backtracked right-hand side solution with further left-hand solutions.

The simplest, most space-efficient, most compatible with state-of-the-art sequential Prolog implementations way to achieve this, is by recomputing the right-hand side.

Backtracking to an AND-parallel Join

Figure 12:
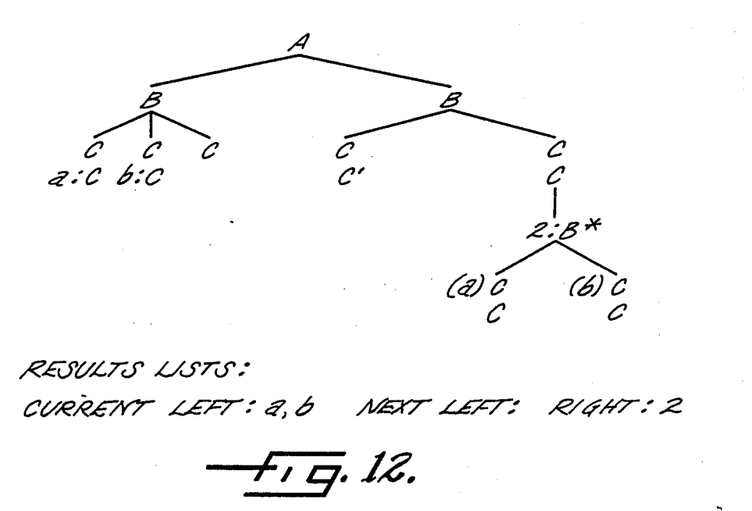
FIG. 12 an AND-parallel execution; backtracking necessitates next generation.
Figure 13:
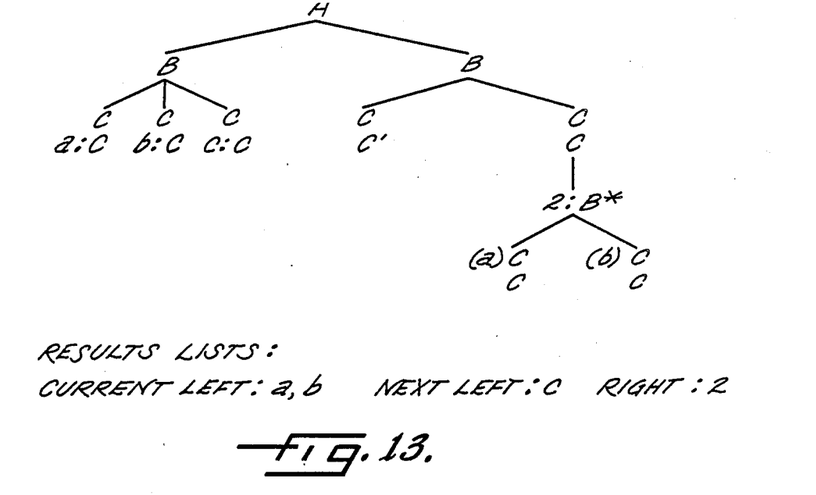
FIG. 13 an AND-parallel execution; next-generation solution on the left.
Figure 14:
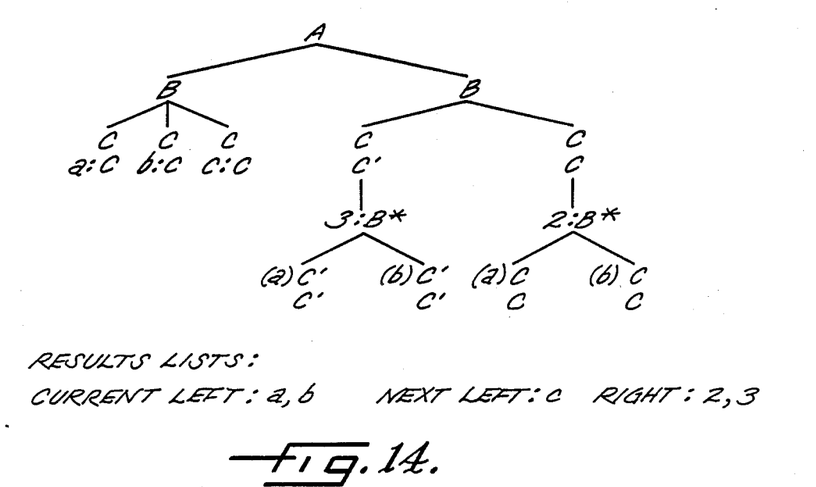
FIG. 14 an AND-parallel execution; new right-hand solution uses current generation.

If the right-hand side is repeatedly recomputed, asynchronously to the computation of the left-hand side, it is possible to pair a left-hand solution, in general, with some right-hand solution one recomputation earlier than with others. However, a recomputation-invariant identification of right-hand solutions is unnecessary if each left-hand solution is paired only with right-hand solutions from a single recomputation. For this purpose a second left-hand results list is added which holds all left-hand solutions that arrive between the first extensible branch point being backtracked past and the right hand side failing and being recomputed. The original results list is called the "current generation" and the new one the "next generation". In FIG. 12 the first extensible branch point has been backtracked past hence the necessity of the "next generation" results list, as will now be explained. New left-hand solutions are added to the next generation without extending any branch points, as shown in FIG. 13. New right-hand solutions form branch points with one child for each member of the current generation, as shown in FIG. 14.

Figure 15:
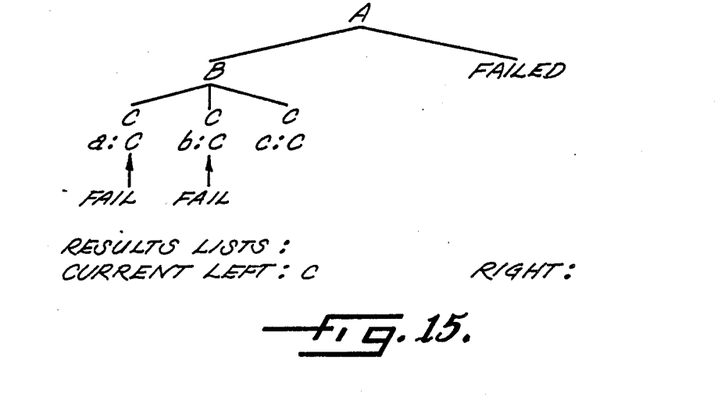
FIG. 15 an AND-parallel execution; right-hand side has failed.
Figure 16:
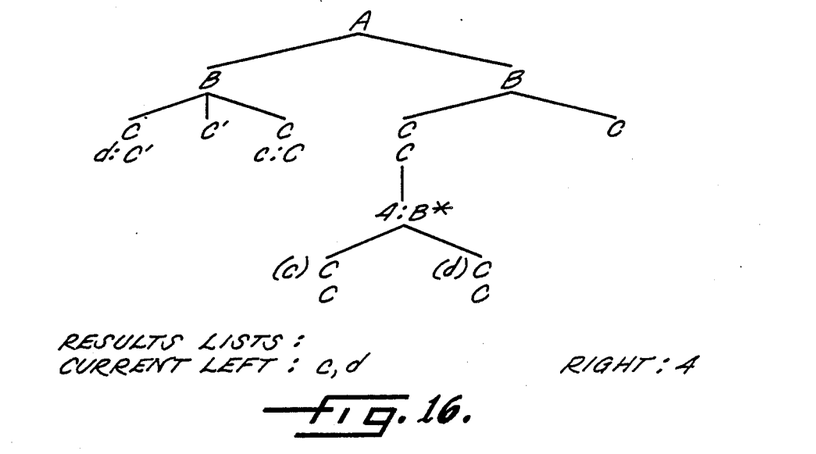
FIG. 16 an AND-parallel execution; execution continues as at the start and
FIG. 17 an AND-parallel execution; waiting necessary.

When the right-hand side fails and backtracks to the AND-parallel fork, three things happen:
  All left-hand branches in the "current generation" are caused to fail.
  The "next generation" becomes the "current generation".
  The right-hand side is recomputed.

This is shown in FIG. 15. Now the cycle is complete and execution proceeds as at the start; see, for example, FIG. 16.

Figure 17:
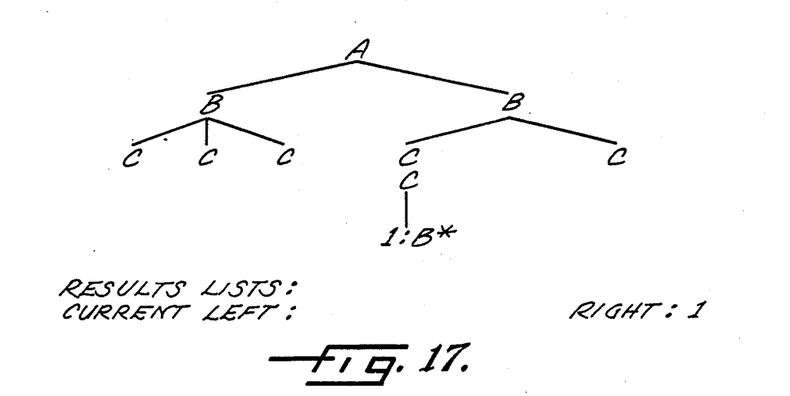

There is still one detail; empty generations are forbidden. If a right-hand solution forms an empty extensible branch point, because there are no left-hand solutions yet, it does not immediately backtrack, but rather, waits for the branch point to be extended. FIG. 17 is an example of where an empty extensible branch point has to wait.

Failure

Only when the left-hand side fails, i.e. backtracking has produced all generations of solutions to the left-hand side, and each has been paired with all solutions to the right-hand side, the left-hand side continues to backtrack to the last choice point or to the branch point preceding the parallel AND. But before the backtracking of the left-hand side may proceed beyond the parallel AND, the right-hand side must also have failed back to the AND-fork.

The right-hand side will eventually fail if all the waiting empty extensible branch points are forced to fail. They can be found by means of the right-hand results list.

Once the left-hand side fails, there is no need to recompute all the right-hand solutions. All that is necessary is for the right-hand side to fail. Thus some method is added to reduce the amount of useless work. This method can take three forms:
- choice points can be eliminated;
- not-yet-active branches can be removed from the schedular's attention
- active branches can be killed.

An implementation of such a method should also be used to force the left-hand side to fail if there are no solutions to the right-hand side.

Although a certain preferred embodiment has been shown and described, it should be understood that many changes and modifications may be made therein without departing from the scope of the appended claims.

We claim:

1. A method of parallel processing a logic program in a computer system, said logic program including a plurality of OR-parallel nodes from which a father process may split off a first son process, said father process having variables commonly accessible by the father and the first son processes, comprising the steps of:
   - executing said father process until a first OR-parallel node is reached;
   - determining whether parallel processing of said first son process may occur;
   - creating a first OR-branch-level label in said father process which identifies said first OR-parallel node;
   - if parallel processing of said first son process may occur, creating a first son hash window in said first son process having bindings to said variables commonly accessible by said father and first son processes said bindings indicating whether each of said variables was set before said first OR-parallel node as identified by said first OR-branch-level label; and
   - executing said first son process in parallel with said father process using the bound variables in said first hash window.

2. The method of claim 1 wherein said determining step is followed by the step of:
   - if parallel processing of said first son process cannot occur, executing said first son process after completion of said father process using said first hash window.

3. The method of claim 1 wherein said creating step further comprises the step of:
   - tagging the bindings to commonly accessible variables with a binding label, said binding label comprising said first OR-branch-level label.

4. The method of claim 1 wherein said method is performed for all of said plurality of OR-parallel nodes, to thereby form a plurality of OR-branch-level labels in a sequence ordered by said plurality OR-parallel nodes.

5. The method of claim 1 wherein said determining step is repeatedly performed during said executing said father process step to repeatedly determine whether parallel processing of said first son process may occur.

6. The method of claim 1 wherein said executing said father process step is preceded by the step of performing sequential processing of a logic program until said father process is reached.

7. A method of parallel processing a logic program in a computer system, said logic program including a plurality of AND-parallel nodes from which a father process may split into at least left and right son processes each having a plurality of left and right son process steps, respectively, said father process having variables, comprising the steps of:
   - executing said father process until a first AND-parallel node is reached;
   - creating first and second hash windows for said left and right son processes respectively, said first and second hash windows in said left and right son processes having bindings to said variables commonly accessible by said father, and said left and right son processes respectively, said bindings indicating a step in said plurality of left and right son process steps at which each of said variables was set;
   - executing said left and right son processes using the bound variables in said first and second hash windows respectively to produce left and right son solutions respectively for each of said left and right son processes for each of said commonly accessible variables;
   - generating cross products from the left and right son solutions for each of said commonly accessible variables; and
   - forming join cells for each of said cross products, each join cell comprising three pointers, one to each of said first and second windows and a pointer to the variables of said father process.

8. The method of claim 7 wherein the step of executing said left and right son processes comprises the steps of:
   - executing said left son process using said first hash window;
   - determining whether parallel processing of said right son process may occur;
   - if parallel processing of said right son process may occur, executing said right son process in parallel with said left son process using said second hash window; and
   - if parallel processing of said right son process cannot occur, executing said right son process after completion of said left son process.

* * * * *